Sept. 23, 1924.  
C. E. RETT ET AL  
1,509,259
METHOD AND APPARATUS FOR MANUFACTURING CUSHION TIRES
Original Filed April 10, 1923    3 Sheets-Sheet 1
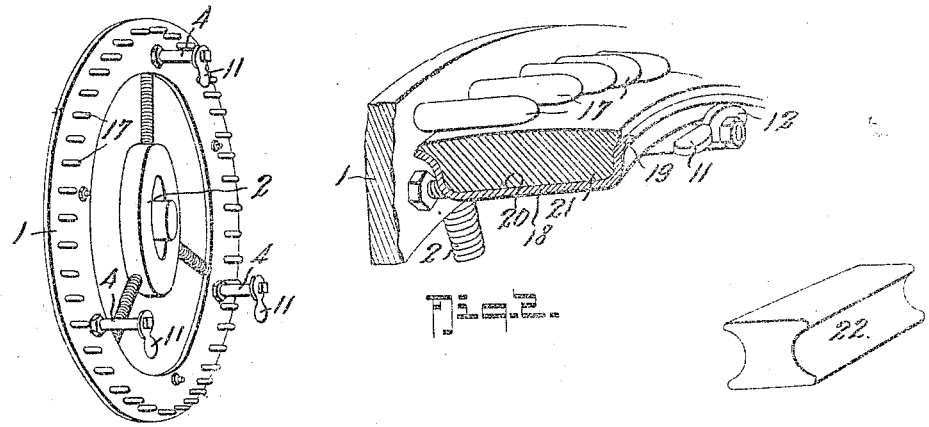
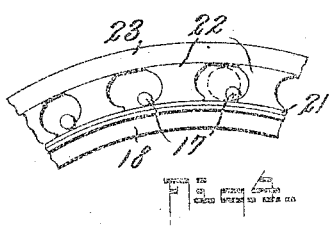
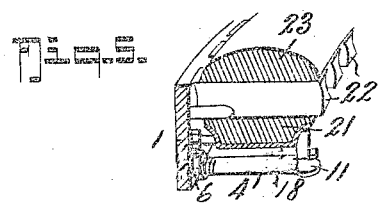
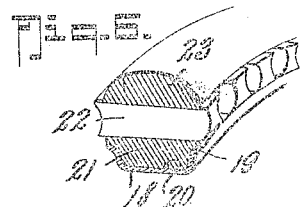
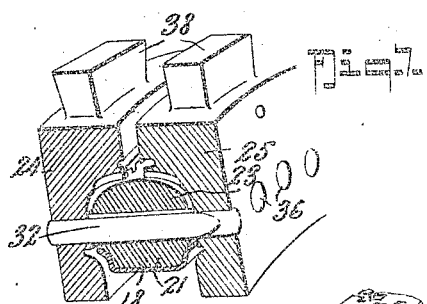
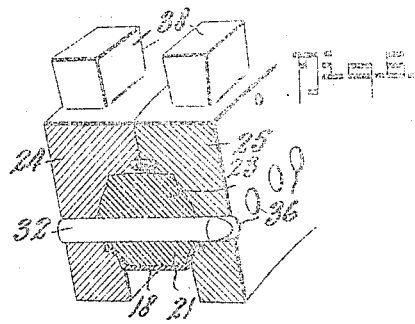
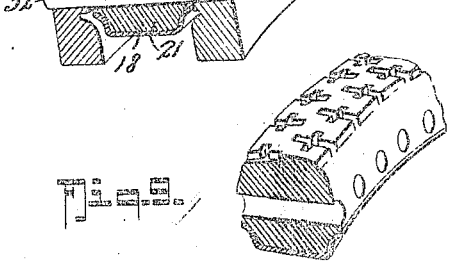
INVENTOR  
Carl E. Rett.  
George S. Anderson.  
BY  
ATTORNEYS

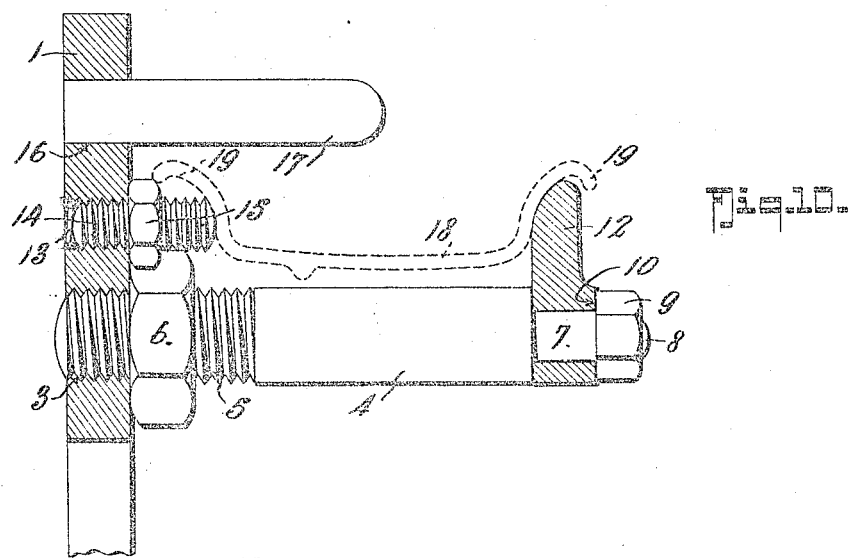
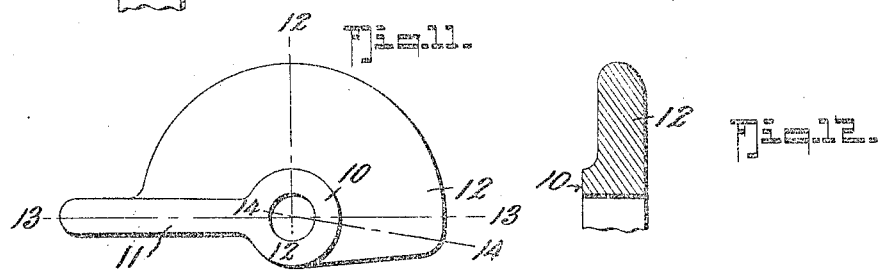
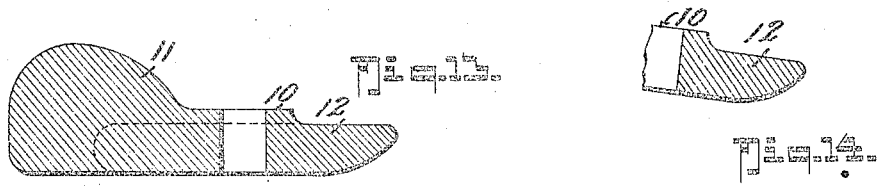
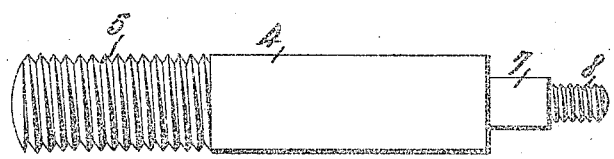

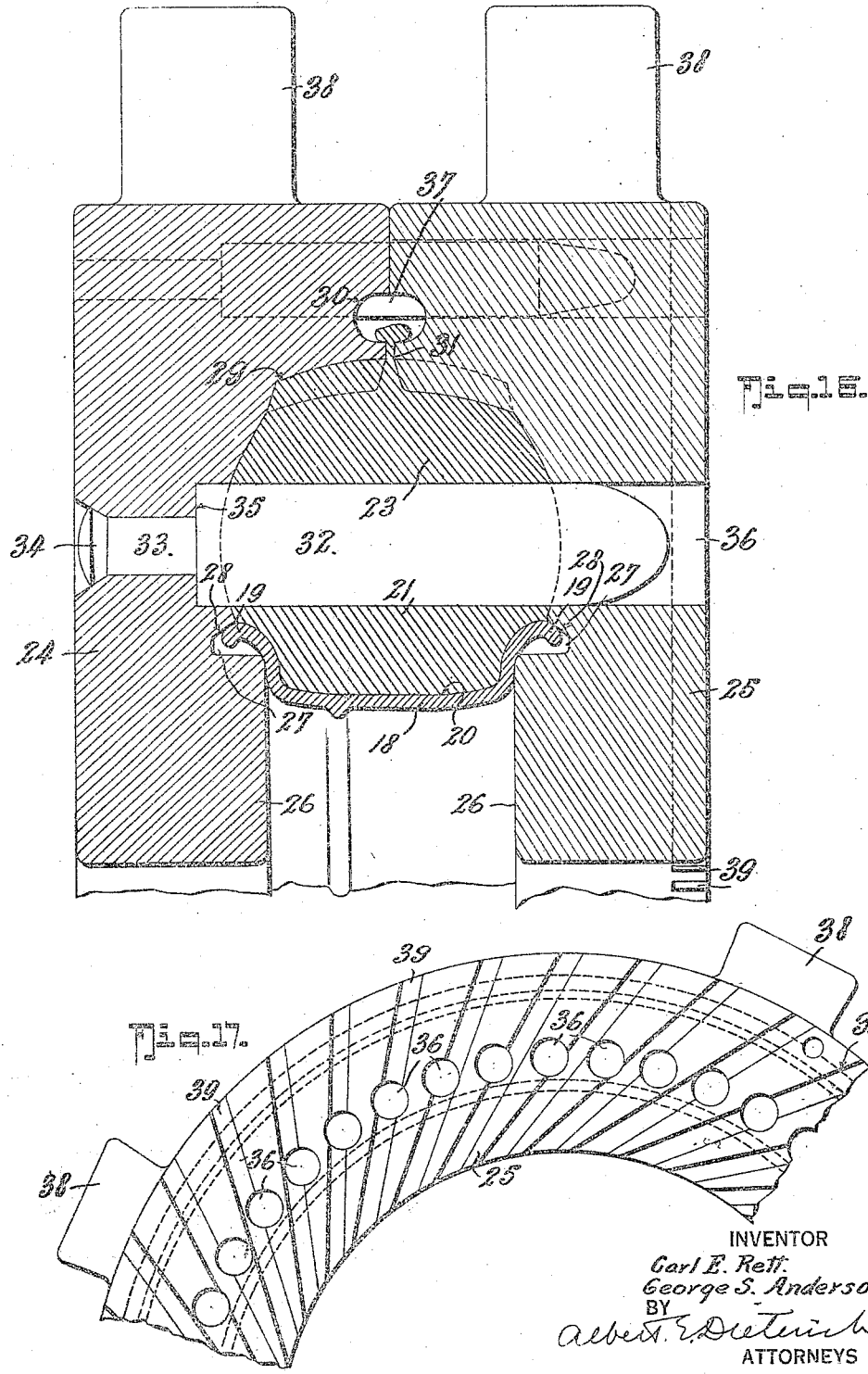

Patented Sept. 23, 1924.

1,509,259

UNITED STATES PATENT OFFICE.

CARL E. RETT AND GEORGE S. ANDERSON, OF AKRON, OHIO, ASSIGNORS TO LAMBERT TIRE & RUBBER CO., OF BARBERTON, OHIO, A CORPORATION OF ARIZONA.

METHOD AND APPARATUS FOR MANUFACTURING CUSHION TIRES.

Application filed April 10, 1923, Serial No. 631,194. Renewed August 7, 1924.

*To all whom it may concern:*

Be it known that we, CARL E. RETT and GEORGE S. ANDERSON, citizens of the United States, residing at Akron, in the county of Summit and State of Ohio, have invented a certain new and useful Method and Apparatus for Manufacturing Cushion Tires, of which the following is a specification.

Our invention relates to the art of tire manufacturing and more particularly to the branch of cushion tire manufacture.

The invention has for its objects to provide a convenient apparatus for use in building a well-known type of cushion tires and to provide an improved method of manufacturing the same whereby the time required to build a tire will be greatly reduced, the use of loose core pins eliminated, the handling of heavy side plates by the tire builder eliminated, transportation of the vulcanizing molds from the tire building room to the vulcanizing room and vice versa is rendered unnecessary, time required to strip the tire from the mold is reduced and the shearing action eliminated (thus reducing the number of seconds).

Other objects of the invention are to provide a method of manufacturing tires and to provide apparatus for use therein, whereby the mold stamping may be made more prominent than at present, there will be less trimming required, whereby building stock can be more readily gauged, weighed or measured (making less waste), whereby the tire will have a better appearance because of less trimmed edges being exposed, and whereby a greater number of tires may be produced in a given time with a given quantity of material than is possible by the use of the methods and apparatus now commonly employed.

With other objects in view which will hereinafter become apparent the invention also resides in those novel steps of operation and features of construction, all of which will be first fully described and specifically pointed out in the appended claims, reference being had to the accompanying drawings, in which:

Figure 1 is a perspective view of a complete tire building template mounted on the spider of a standard tire building stand.

Figure 2 is an enlarged detail section of the template with a standard rim in working position.

Figure 3 is a detail perspective view of one of the blocks used in building up the tire.

Figure 4 is a detail elevation of a portion of the built up tire of the rim, located on the template and showing in dotted lines the finished diameter of the holes as completed with the initial hole cross section area.

Figure 5 is a detail sectional perspective view of the built tire just prior to its removal from the template.

Figure 6 is a detail perspective view of a portion of a tire after its removal from the template ready for insertion in the vulcanizing mold.

Figure 7 is a detail sectional perspective view of a tire in the vulcanizing mold before the mold is closed to squeeze the tire.

Figure 8 is a view similar to Figure 7 with the mold closed.

Figure 9 is a detail perspective view of a portion of the finished tire.

Figure 10 is an enlarged diagrammatical cross section of a portion of the template with a standard rim shown in dotted lines in place and indicating the relative positions of the clamping bolts, spacer studs and gauging pins with relation to the center of the template.

Figure 11 is a detail elevation of one of the clamping cams.

Figures 12, 13, and 14 are respectively detail cross sections on the lines 12—12, 13—13 and 14—14 of Figure 11.

Figure 15 is a detail elevation of one of the clamping bolts.

Figure 16 is an enlarged cross section of the vulcanizing mold with a rim and tire in place, the mold being closed.

Figure 17 is a detail elevation of the portion of the mold showing the steam passages in the outer face of the mold.

Referring now to the accompanying drawings in which like numerals of reference indicate like parts in all of the figures, 1 is the template which is mounted on the usual spider 2 of the tire carrying stand. The template includes a plate having a concentric row of threaded apertures 3 in which the clamping bolts 4 having threads 5 are screwed and held adjustable by clamp nuts 6. The bolts 4 have reduced portions 7 on which the clamping cams 12 pivot, the cams being held in place by nuts 9 on the threaded ends 8 of the bolts 4.

In practice it is found sufficient and preferable to employ three bolts 4 and to arrange them in such manner that the tire rim 18 will slip over the bolts as indicated in Figures 2, 5 and 10 of the drawings. The clamping cams 12 have bearing hubs 10 and wings 11, the latter being provided for conveniently turning the lugs into and out of clamping position.

In addition to the concentric row of apertures 3, the plate 1 is also apertured with concentric apertures 13 in which the threaded studs 14 are secured adjustably by the jamb nuts 15. Three of the studs 14 are provided and set approximately diametrically opposite the bolts 4.

The plate 1 is further provided with a concentric series of holes 16 in which the gauging pins 17 are held with retaining friction. As shown in Figure 10 the relative positions of the axes of the bolts 4, studs 14 and pins 17, from the axis of the template ring or plate 1 are such that a rim 18 can be held in position and can be spaced closer to or farther from the plate 1 by changing the adjustment of the bolts 4 and 14. The purpose of this will be apparent later.

The standard rim 18 is provided with the usual flanges 19, one of which engages the ends of the studs 14 while the other is engaged by the cams 12 when the rim is held in place.

So far as described the method of building tires constituting a part of this invention consists in taking the rim 18, plating it with a film 20 of a material having an affinity for rubber (brass for example). This surface is then covered with a rubber cement and the base structure 21 of the tire is built up to the desired height. This base structure may be built up in the rim 18 in any desired manner, as for instance, by laying superimposed strips of rubber in the rim or by die-expressing the rubber 21 and laying it in the rim in one piece. The base structure 21 may be built in the rim before the rim is placed on the template or the rim may be placed on the template and the base structure built in while on the template, in which event the pins 17 may be initially omitted if desired. The pins 17, it will be noted, pass only a short distance across the tire base 21 (see Figures 2 and 5) and serve a two-fold purpose of gauging the depth of the base portion 21 and acting as guides for the proper location of the cross blocks 22.

The stud and check nuts 14—15 are adjusted to hold the rim 18 away from the plate 1 a definite and predetermined distance while the clamp cams 12 hold the rim up against the studs. The blocks 22 are cut a predetermined length greater than the width of the molded tire (an amount that will make up for the loss in volume when the space between adjacent blocks are partly filled to form the cross holes of proper diameters).

After the base structure has been built up and the parts positioned as shown in Figure 4 the blocks 22 are then located against the pins 17, as shown in Figure 2, and the tread stock 23 is then laid over the blocks and spliced. The work then appears as indicated in Figure 5. The completed tire with the rim is then removed from the template or the building stand spider, as the case may be, taken to the curing room and laid into the male half of the mold over the pins 32. As the holes in the built up tire are larger than the pins 32 when the tire is placed over the pins it will readily slide without distortion. The female half of the mold is then located in position, the pins 32 entering the holes 36. The parts are then in position as indicated in Figure 7, and the mold is then ready to be placed in the vulcanizing kettle. Several molds are placed in the kettle at the same time, one on top of the other flatwise, and hydraulic pressure is usually applied to squeeze the mold halves together and squeeze the contents of the mold halves to fill all of the spaces or cavities in the molding chamber by displacing the rubber. As the blocks 22 are longer than the finished width of the tire the rubber displaced from those blocks will close up the holes between them to fill around the pins 32, reducing the area of the holes, as indicated in dotted lines in Figure 4 and also causing the tread stock to be forced into the recesses of the tread design, etc. so that when the tire is vulcanized and finally removed from the mold it will appear somewhat as in Figure 9 of the drawings.

The molds which we prefer to use in the manufacture of this tire consist of two plates 24 and 25, one of which, 24, is provided with recesses 35 and apertured to receive the pins 32 which have their shanks 33 riveted at 34 to make the pins 32 a permanent part of the mold plate 24. Each mold plate has inner walls 26 designed to engage the sides of the rim 18 and each has annular grooves 27 with bevelled surfaces 28 to receive the flanged edges 19 of the rim 18 and center the rim in the molds.

The molding chamber consists of a half cavity in each mold section 24—25 and includes the tread forming portion 29 in which the desired tread design is worked in the usual way. Each mold plate 24, 25 is adapted to come together at the peripheral edge as indicated in Figure 16 and is so designed to leave a slight overflow space 31 between the molding chamber and the overflow chamber 30, the later being in the nature of an annular edge groove in each mold plate, the half grooves matching as shown.

In order to properly position the lugs 38 on the plates 24, 25 the plates are provided with dowel pins 37 and holes to receive them. The lugs 38 are provided for the reception of temporary clamping elements and also to provide convenient means for the raising and lowering gear to catch hold of in removing and introducing the molds from and to the vulcanizing kettle.

As the tire molds are placed in the kettle one at a time it is desirable that the steam may have an ample time to circulate between the molds and fill the interior or center spaces thereof. Therefore the exterior surface of the female mold (preferably) is provided with steam circulating grooves 39 which extend approximately tangential to the curvature of the molds and assists in whirling the steam in the kettle and thus causes an effective circulation of steam as it passes through the kettle from the place of entrance to the place of exit.

After the tire has been thoroughly vulcanized the molds are removed from the kettle and pried apart to strip them from the tire. The excess rubber which passed into the spaces 31 is then trimmed off and the tire will be then ready for the market.

Thus it will be seen that in the employment of this method and apparatus the following advantages of this method of making "cushion" tires over the present method are obtained, namely:—

1. Quicker building, since the time required to build a tire from the present practice is reduced to about one-third of the time.

2. There is a great saving in the use of core pins; at the present time the general practice is to carry a large and various assortment of core pins since the ends of the pins are continually swaged when driven into the side plates, calling for continued grinding and replacement.

3. Tire builders are not required to handle heavy side plates, forms between which the tires are now built, and thereby the tire builders do not run so great a risk of bodily injury.

4. The tire building room and the curing room may work independently of each other, whereas under the present practice they are dependent on each other for side plates; in the present practice the tires are built up between side plates which constitute, as well, the side plates of the molds.

5. The molds remain in one location, i. e. the curing room, instead of being transported back and forth from the tire building room to the curing room as under the present practice.

6. The molds are comparatively cheaper as the pins are attached to the molds as against loose pins at present largely employed.

7. A saving of the time required to strip the tire from the mold is effected and more tires and molds per man can be handled than under the present practice.

8. No shearing action is required in stripping the tires from the molds, thus reducing the number of seconds.

9. Mold stamping may be made more prominent than at present.

10. Less trimming is required because the trimmer is not required to trim around each hole nor around the joint between the tread and side wall as is the case where loose pins and rim plates are used in the molds.

11. Building stock can be more readily gauged, weighed, or measured, the waste thus reduced to the minimum.

12. The finished tire has a better appearance because of less trimmed edges being exposed.

13. The capacity of heater presses is increased because the mold halves go closer together than in the case where the molds are provided with separable tread rims, and lastly 14. Supervision and inspection can conveniently be made.

From the foregoing description, taken in connection with the accompanying drawings, it is thought that the method employed and apparatus will be clear to those skilled in the art to which it appertains.

What we claim is:

1. The method of manufacturing cushion tires which consists in associating a rim with a template, building up the tire base structure in the rim to the depth gauged by the template, holding the rim in a definite position on the template, placing crosswise, at intervals, blocks of rubber of a length greater than the width of the finished tire and at intervals substantially greater than the diameter of the holes in the finished tire, placing the tread structure around the blocks, removing the rim and its contents from the template, inserting the same in a compressing and vulcanizing mold, subjecting the mass to vulcanizing temperature and thereafter removing the tire from the mold and trimming the excess rubber therefrom.

2. The method of manufacturing cushion tires having holes through the same, said method consists in taking a standard rim and building up a base structure therein, locating the same on a template, placing rubber blocks of greater length than the width of the finished tire around and on said base structure with the ends of the blocks engaging the template, holding the blocks spaced apart a substantially greater distance than the diameter of the finished holes, placing tread rubber around the blocks, removing the rim and rubber structure from the template and applying compressing pressure to the outside of the rubber mass to displace the rubber of the blocks and cause the same to partially fill the spaces between adjacent blocks while restraining said displacement within predetermined limits, and vulcanizing the mass under pressure.

3. A tire builder's template, comprising a plate with a concentric row of gauging pins, rim clamps and rim spacing lugs.

4. A tire builder's template comprising a ring plate, rim holding elements for mounting the rim on the plate, and rim spacer studs for determining the position of the rim with regard to the plate.

5. A tire builder's template comprising a ring plate, rim holding elements for mounting the rim on the plate, and rim spacer studs for determining the position of the rim with regard to the plate and gauging pins carried by the plate and projected over the rim.

6. A tire builder's template comprising a plate, a set of rim holding and centering clamp bolts and spacing studs for locating a rim in place and gauging pins carried by said plate outside the circle of the rim and projected over the rim.

7. A tire builder's template comprising a plate, a set of rim holding and centering clamp bolts and spacing studs spaced alternately with said bolts for locating a rim in place, and gauging pins carried by said plate outside the circle of the rim and projected over the rim.

8. A tire builder's template comprising a plate having two sets of alternately spaced threaded holes, a set of clamping bolts with jamb nuts held in one set of holes and a set of threaded spacer lugs with jamb nuts held in the other set of holes.

9. A tire builder's template comprising a plate having two sets of alternately spaced threaded holes, a set of clamping bolts with jamb nuts held in one set of holes and a set of threaded spacer lugs with jamb nuts held in the other set of holes, said plate having a third set of holes and gauging pins held in said third set of holes.

10. A tire mold comprising male and female plates, the male plates having fixed pins and the female plates having holes to receive the pins, said plates having abutting surfaces at their peripheries and having spaced walls to receive and locate a rim between the same, said plate enclosing a forming chamber, said plate having rim edge receiving grooves with means to center the rim.

11. A tire mold comprising male and female plates, the male plates having fixed pins and the female plates having holes to receive the pins, said plates having abutting surfaces at their peripheries and having spaced walls to receive and locate a rim between the same, said plate enclosing a forming chamber, said plate having rim edge receiving grooves with means to center the rim, said plate having a single rubber overflow chamber with a restricted passage between the same and the forming chamber.

CARL E. RETT.
GEORGE S. ANDERSON.